United States Patent [19]

Flaig et al.

[11] Patent Number: 4,763,768

[45] Date of Patent: Aug. 16, 1988

[54] OVERLOAD PROTECTION

[75] Inventors: Heinz Flaig, Bochum; Heinz Hasselmann, Hagen, both of Fed. Rep. of Germany

[73] Assignee: Mannesmann Aktiengesellschaft, Duesseldorf, Fed. Rep. of Germany

[21] Appl. No.: 887,066

[22] Filed: Jul. 17, 1986

[30] Foreign Application Priority Data

Jul. 18, 1985 [DE] Fed. Rep. of Germany ....... 3525666

[51] Int. Cl.[4] .......................... F16P 3/00; F16H 57/00

[52] U.S. Cl. ................................ 192/150; 74/412 TA

[58] Field of Search .............................. 192/150, 56 R; 74/412 TA, 446; 200/61.46; 464/46, 30

[56] References Cited

U.S. PATENT DOCUMENTS

| | | | |
|---|---|---|---|
| 2,232,545 | 2/1941 | Lum | 192/150 X |
| 2,753,703 | 7/1956 | McIntyre | 464/46 X |
| 3,050,598 | 8/1962 | Fennessy | 192/150 X |
| 3,201,953 | 8/1965 | Firth | 464/46 |
| 3,203,268 | 8/1965 | Manoni et al. | 464/46 X |
| 3,323,328 | 6/1967 | Montgomery | 464/46 |
| 3,435,695 | 4/1969 | Rivers | 192/150 X |
| 3,584,715 | 6/1971 | Miller | 192/150 X |
| 3,893,553 | 7/1975 | Hansen | 192/150 X |
| 4,593,800 | 6/1986 | Ness et al. | 192/150 X |

FOREIGN PATENT DOCUMENTS 2714452 10/1977 Fed. Rep. of Germany .

*Primary Examiner*—Rodney H. Bonck
*Attorney, Agent, or Firm*—Ralf H. Siegemund

[57] ABSTRACT

A bi-directionally effective overload protection device for a rotation machine part includes two coaxially arranged, mutually juxtaposed ring discs frictionally connected to a machine; a gear disc with outer gearing and inwardly directed flange means circumscribes the ring discs; a plurality of springs hold said gear disc normally in particular position in relation to the ring discs, permitting the gear disc to rotate relative to the ring discs upon occurrence of an overload in either directional rotation; a dual switching ring having an inner and an outer ring portion is connected to the second ring disc through resilient bar or leaf spring portions of the switching ring; actuator ramps on the outer and inner ring portions cooperate with axially extending cams on the gear disc so that either the inner or the outer ring is axially shifted on overload in one or the other direction; switches are arranged in relation to the inner and outer ring portion for being actuated by the particular one that is axially shifted on occurrence of overload.

6 Claims, 2 Drawing Sheets

Fig.3
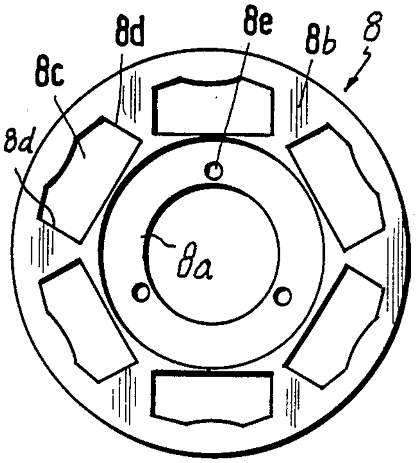
Fig.4
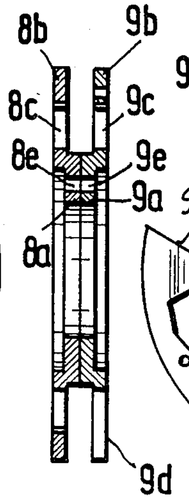
Fig. 5
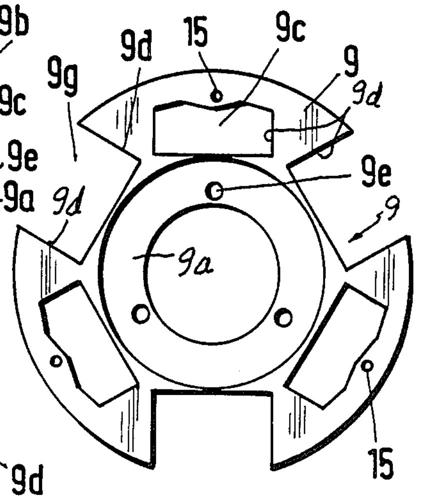
Fig.6
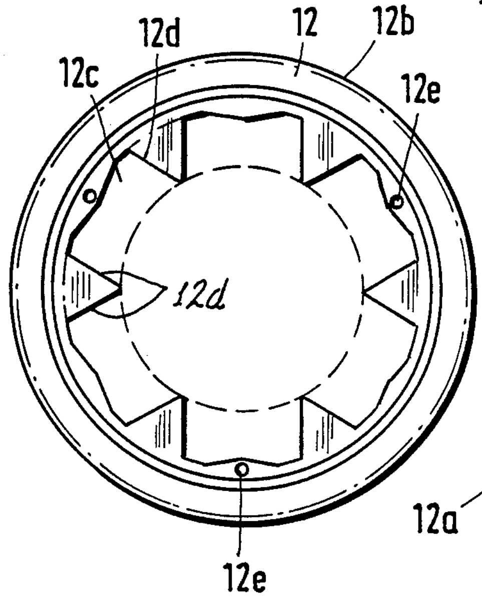
Fig.7
Fig.8
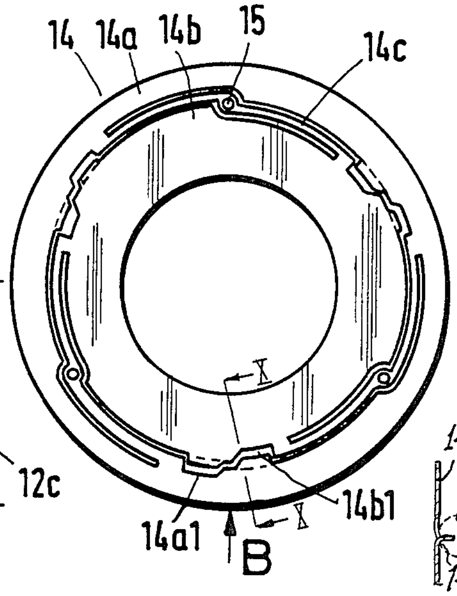
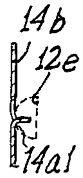
Fig.10
Fig.9
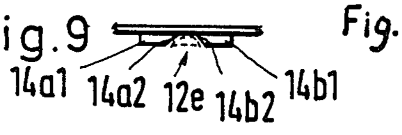

OVERLOAD PROTECTION

BACKGROUND OF THE INVENTION

The present invention relates to an overload protection device for a machine such as a motor, for turning the motor off in case of a mechanical overload on the machine shaft. More particularly, the invention relates to an overload protection device which includes driven disc means with overload springs holding the disc means in relation to a gear providing the external connection to the potentially overload producing load. The springs being situated inside of the annular disc means, and the device further includes a coaxial switching ring which upon turning of the ring discs actuates a switch for turning the motor off.

An overload protection device of the type to which the invention pertains is for example, shown in German Pat. No. 2,714,452. The device shown in this patent however is effective only in a uni-directional manner, particularly responding to the lifting of a lifting device. The rotational part can rotate in one direction only and is blocked against opposite direction overload. Thus, protection in this forbidden direction is not necessary. On the other hand, there are many areas in which a mechanical overload protection is desired to be effective in both directions of rotation.

DESCRIPTION OF THE INVENTION

It is an object of the invention to provide a new and improved overload protection device using as a point of departure the above mentioned prior art device but providing modifications and supplementations so that the protection becomes effect in both direction.

In accordance with the preferred embodiment of the present invention, it is suggested to render a ring gear rotatable in both direction relative to two ring discs the latter being coupled to the shaft, two switches are positioned adjacent to one of the ring discs and resilient bar means connects an outer ring with an inner ring of a switching ring assembly adjacent that one ring disc; moreover, the outer and inner rings have switching ramps cooperating with a cam on the gear such that upon relative rotation of the gear on account of overload in one direction, one of the concentric switching rings is shifted axially for operating one of the switches and in case of an overload in the opposite direction, the other one of the switching discs is shifted axially to operate the other switch. Strictly speaking, a single turn off switch may suffice, but conceivably direction responsive switching steps may have to be taken.

In case of an overload regardless of the direction, the gear will be turned against the force of the compressed overload springs whereby the cam is actuated by one or the other switching ramp depending upon the relative rotation of the gear and that will shift either the outer or the inner ring in axial direction and the shifted rings will cause the respective associated switch to turn the machine off. Preferably at least three cams are respectively associated with the three switching ramps on the inner switching ring and three ramps on the outer ring. The ring discs having inner areas, cooperating with abuting friction ring discs, whereby at least one coupling spring is arranged to force the friction discs against the ring discs particular friction lining as their areas. This way one obtains a slip friction kind of clutch which will causes the gear to stop immediately even if the motor (machine) still rotates a little following a turn off signal.

One of the friction discs carries a centering device for the ring discs.

In furtherance of the present invention, at least three recesses are provided in the ring discs as well as a flange of the gear being disposed in between the ring discs. These recesses are axially aligned and are provided for maintaining overall symmetry of the. The recesses receive their overload springs, being configured as coil springs and pretensioned through their position between limiting surfaces of the ring discs.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 3 is a front view of one of the ring discs of FIGS. 1 and 2 but illustrated in isolation and on a somewhat smaller scale;

FIG. 4 is a section view through the two ring discs of the device shown in FIG. 1 and 2;

FIG. 5 is a front or side view of one of the discs shown in FIG. 4;

FIG. 6 is a front view of a gear included in the device shown in FIGS. 1 and 2;

FIG. 7 is a partial section partial edge on view of the gear shown in FIG. 6;

FIG. 8 shows a double switch ring in front view being also included in the device shown in FIGS. 1 and 2;

FIG. 9 is a portion of the view of FIG. 8 as illustrated therein by arrow B; and FIG. 10 is a section view through a detail of that area B.

Proceeding now to the detailed description of the drawings.

Figure 2:
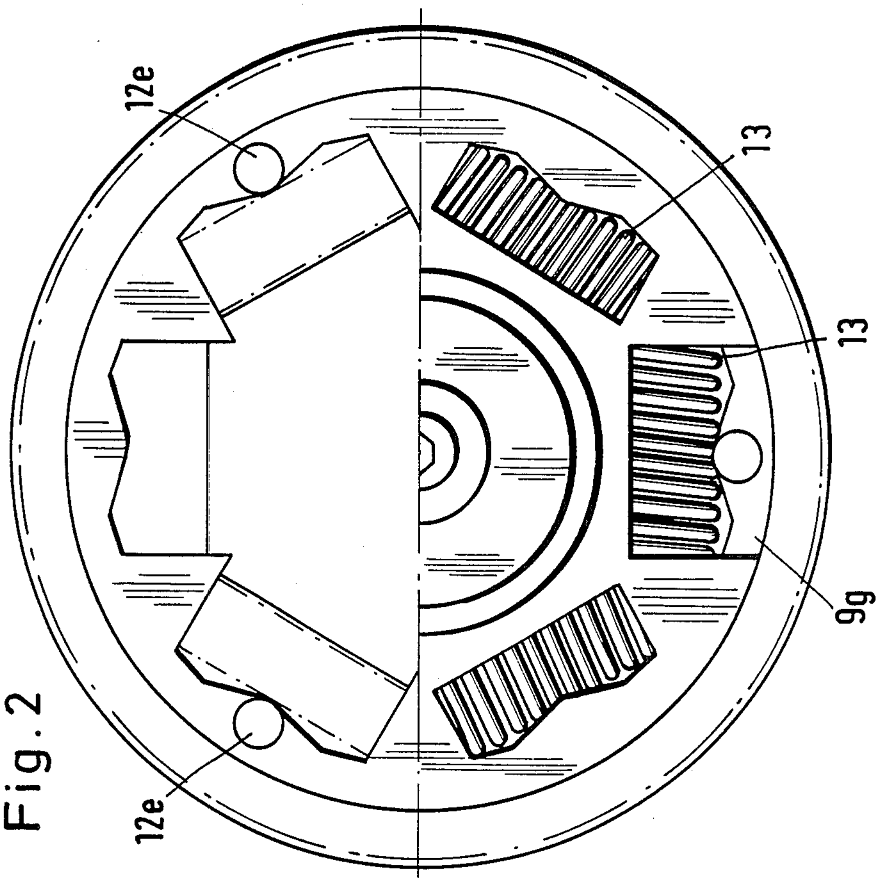
FIG. 2 is a view of the device shown in FIG. 1 as illustrated in the viewing direction A.
Figure 1:
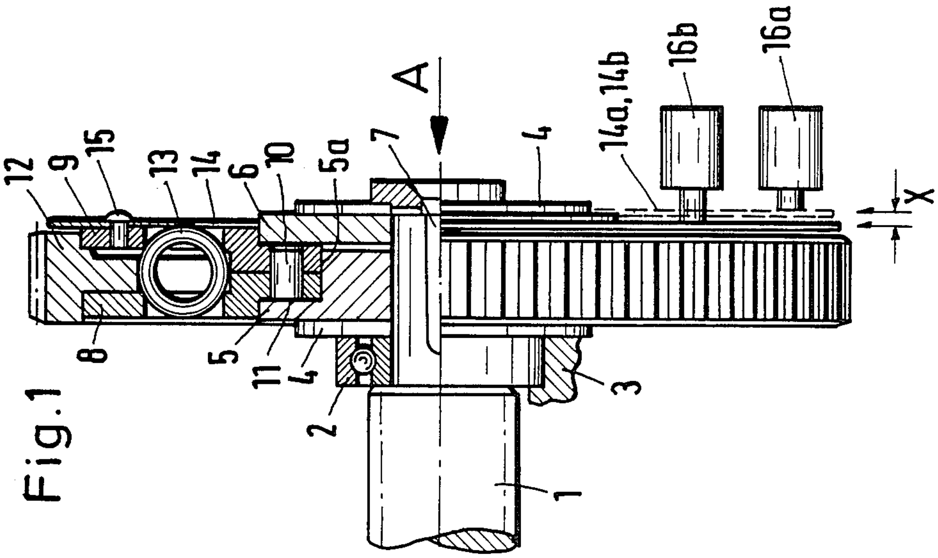
FIG. 1 is a partial side view partial section view of an overload protection device constructed in accordance with the preferred embodiment of the invention for practicing the best mode thereof.

The figures, particularly FIG. 1, illustrate the shaft 1 of a machine such as a motor; the motor itself is not shown but the shaft runs in bearings 2 for mounting of the motor and its shaft in a motor casing 3. The shaft 1 carries two friction discs 5 and 6 being connected thereto by means of springs 7. These friction discs are forced against rings or ring discs 8 and 9 respectively through disc spring 4 there being friction linings 11 interposed. Th ring discs 8 and 9 are juxtaposed and in coaxial relation to each other and to shaft 1. The friction disc 5 has an axially extending centering extension, being inserted into radially inwardly extending flange parts 8*a* and 9*a*, respectively, of the ring discs 8 and 9. FIGS. 3, 4, 5, illustrates these flanges 8*a* and 9*a* without the insertion of the centering extension 5*a*.

The ring discs 8 and 9 have three bores 8*e* and 9*e* respectively for receiving pins 10 which interconnect the two discs 8 an 9 for enforcing uniform rotation. In addition the two ring discs 8, 9 are provided with a plurality of particularly contoured opening recesses and cutouts. There are six openings in disc 8 and three in disc 9. The latter are in axial alignment with three openings 8*c* and receive the overload sensing and operating springs 13. These springs are inserted in a compressed state and are then biased as against limiting surfaces 8*d* and 9*d* respectively of the openings 8*c* and 9*c*. The outer ring portion in each instance, 8*b* and 9*b*, respectively, engage and center radially inwardly extending a flange portion 12*a* of a ring 12 having an outer gearing 12*b*. The ring 12, moreover, is also provided with openings or cutouts 12*c* including limiting surfaces 12*d* for alignment with the surfaces 8*d* and 9*d*, and for abutment with the overload springs 3. In case of an overload, ring 12 can move relative to the rings 8 and 9 in one or the opposite direction and thereby compresses the springs 13 further.

Three of the recesses in disc 9 are indents or cutouts 9*a* being open towards the periphery of the ring 9. They are axially aligned with the remaining three openings 8*c* of disc 8. These cutouts cooperate with switching lips 14*a*1 and 14*b*1 of a twin or dual switching ring 14 (infra). Ring 14 is riveted by means of rivet 15 to the disc 9. FIGS. 8 and 9 illustrate the twin, dual or double switching ring 14 in greater detail. This ring is constructed to have an outer ring 14*a* and inner ring 14*b*, and these rings are interconnected through three leaf springs or spring bars like portions 14*c* there being altogether three of these springs or spring bars. Bores for rivets 15 traverse the center of each spring bar 14*c* for purposes of fastening the twin or dual switching ring to the ring disc 9. In fact then, the center of each leafspring 14*c* is fastened to ring 9 permitting axial deflection of outer ring 14*a* or inner ring 14*b*. The spring bar 14*c* each cover approximately 80 degrees is peripheral direction and permit, depending upon the direction of overload, an axial shift without or very little power, either of the outer ring 14*a* for operating the switch 16*a* or for shifting the inner ring 14*b* by distance X for purposes of actuating switch 16b shown in the bottom part of FIG. 1. X may amount to, for example, 4 millimeters so that the switch can be used directly and constructed as snap action device.

The switching ramps 14*a*1 and 14*b*1 have run up surfaces 14*a*2 and 14*b*2 to both sides next to an axially extending cam 12*e* of the gearing 12. Thus, whenever in case of overload the gear 12 is turned relative to the discs 8, 9, and depending upon the direction, either the ramps 14*a*1 of outer ring 14*a* or the ramps 14*b*1 of inner ring 14*b* engage the respective cam 12*e* and the latter causes the above mentioned axial shift either of the outer ring 14*a* or of the inner ring 14*b* as the case may be in order to actuate respectively switch 16*a* or 16*b*.

The invention is not limited to the embodiments described above, but changes and modifications thereof, not constituting departures from the spirit and scope of the invention are intended to be included.

We claim:

1. Bi-directionally effective overload protection device for a rotation machine part having a rotating shaft, comprising:

first and second, coaxially arranged, mutually juxtaposed ring discs being connected to the shaft;

a gear disc with outer gearing and inwardly directed flange means being arranged between said ring discs;

a plurality of springs holding said gear disc normally in particular position in relation to the ring discs, the springs permitting the gear disc to rotate relative to the ring discs upon occurrence of an overload in either directional rotation;

a switching ring having an inner ring portion and an outer ring portion and being connected to the second ring disc through resilient bar or leaf spring portions of the switching ring;

actuator ramp means on the outer and inner ring portions for cooperation with axially extending cam means on the gear disc so that either the inner or the outer ring is axially shifted on overload in one or the other direction; and switch means arranged in relation to the inner ring portion and the outer ring portion, for being actuated by the respective particular one of the inner ring portion or of the outer ring portion which is being axially shifted on occurrence of an overload.

2. Overload protection as in claim 1 including friction means for connecting the ring discs to the shaft.

3. Overload protection as in claim 2 including centering means inserted in the ring discs.

4. Overload protection as in claim 2 the friction means including two friction discs secured to said shaft, said ring discs having inwardly oriented flanges, there being springs urging said flanges against said friction discs, there being friction linings interposed between the flanges and the friction discs.

5. Overload protection as in claim 1 said flange means of said gear disc being constructed and oriented for limiting relative axial movement of said ring discs in relation to the gear disc.

6. Overload protection as in claim 1 said ring discs as well as said gear disc have axially aligned recesses and openings for receiving said springs, said springs being constructed as coil springs being inserted under tension in said openings and recesses.

* * * * *